(12) United States Patent
Shorter et al.

(10) Patent No.: US 7,703,832 B2
(45) Date of Patent: Apr. 27, 2010

(54) BREAKAWAY VISOR

(75) Inventors: William Robert Shorter, Sterling Hts., MI (US); Leslie R. Hinds, Oxford, MI (US); Joseph P. Wieczorek, Lake Orion, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 0 days.

(21) Appl. No.: 12/214,145

(22) Filed: Jun. 17, 2008

(65) Prior Publication Data

US 2009/0309385 A1  Dec. 17, 2009

(51) Int. Cl.
*B60J 3/02* (2006.01)
(52) U.S. Cl. ............ 296/97.13; 296/97.12; 296/187.05
(58) Field of Classification Search ................ 296/97.9, 296/97.12, 97.13, 187.05; 280/748; 160/DIG. 3
See application file for complete search history.

(56) References Cited

U.S. PATENT DOCUMENTS

| | | | | |
|---|---|---|---|---|
| 4,533,275 | A * | 8/1985 | Foggini | 403/165 |
| 4,598,943 | A | 7/1986 | Scholz et al. | |
| 4,729,590 | A * | 3/1988 | Adams | 296/97.13 |
| 4,756,570 | A * | 7/1988 | Cooper | 296/97.13 |
| 5,011,211 | A | 4/1991 | Svensson | |
| 5,082,322 | A * | 1/1992 | Cekander et al. | 296/97.9 |
| 5,184,867 | A * | 2/1993 | Prillard | 296/97.9 |
| 5,486,033 | A | 1/1996 | Lecorvaisier et al. | |
| 5,544,928 | A | 8/1996 | Mori et al. | |
| 5,580,117 | A | 12/1996 | Goclowski | |
| 5,653,496 | A | 8/1997 | Mori et al. | |
| 5,660,424 | A * | 8/1997 | Aymerich et al. | 296/97.12 |
| 5,855,443 | A | 1/1999 | Faller et al. | |
| 6,059,348 | A | 5/2000 | Viertel et al. | |
| 6,334,626 | B2 | 1/2002 | Nakajima et al. | |
| 6,382,697 | B1 * | 5/2002 | Mulder et al. | 296/97.5 |
| 6,475,937 | B1 | 11/2002 | Preisler et al. | |
| 6,494,521 | B2 | 12/2002 | Hennessey | |
| 6,604,773 | B2 | 8/2003 | Aoki et al. | |
| 6,679,538 | B1 | 1/2004 | Sturt | |
| 6,685,257 | B1 | 2/2004 | Beland et al. | |
| 6,796,593 | B2 | 9/2004 | Hennessey | |
| 6,799,795 | B1 * | 10/2004 | Zapinski | 296/187.05 |
| 6,860,546 | B1 | 3/2005 | Fero et al. | |
| 6,921,121 | B2 | 7/2005 | Schneider et al. | |
| 6,948,736 | B2 | 9/2005 | DePottey et al. | |

(Continued)

FOREIGN PATENT DOCUMENTS

JP  2001-80354 A * 3/2001

(Continued)

*Primary Examiner*—Jason S Morrow
(74) *Attorney, Agent, or Firm*—Raggio & Dinnin, P.C.

(57) ABSTRACT

A breakaway visor for use in a vehicle includes a visor body and a molded tubular member having a first end and a second end wherein the first end is rotatably supported with respect to the roof of a vehicle via a visor mounting bracket. The visor arm also includes an elbow portion arranged a predetermined distance from the first end of the molded tubular member. The visor arm also includes a metal tubular insert member arranged within the molded tubular member. The metal tubular insert member will have a first end within the molded tubular member and arranged a predetermined distance from the first end of the molded tubular member. This first end of the metal tubular insert member will define the break point for the breakaway visor.

16 Claims, 8 Drawing Sheets

U.S. PATENT DOCUMENTS

| | | |
|---|---|---|
| 7,059,652 B2 | 6/2006 | Aoki et al. |
| 2004/0032144 A1* | 2/2004 | Arendsen et al. ........... 296/97.9 |
| 2005/0082867 A1* | 4/2005 | Aoki et al. ................. 296/97.9 |
| 2007/0120390 A1* | 5/2007 | Wheeler et al. ............ 296/97.9 |

FOREIGN PATENT DOCUMENTS

WO     WO-9514585 A1 *   6/1995

* cited by examiner

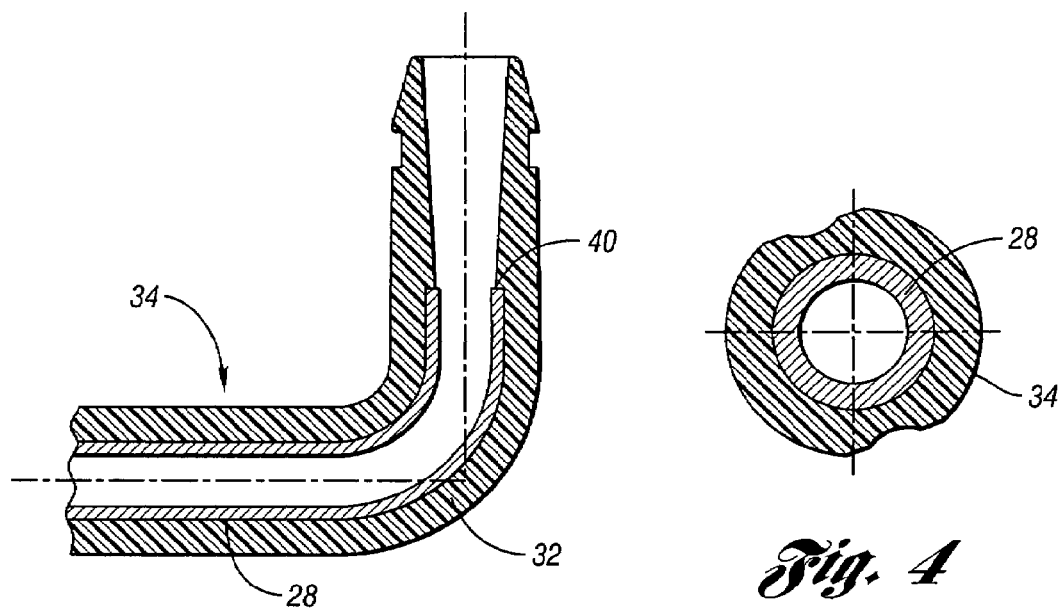
Fig. 3
Fig. 4
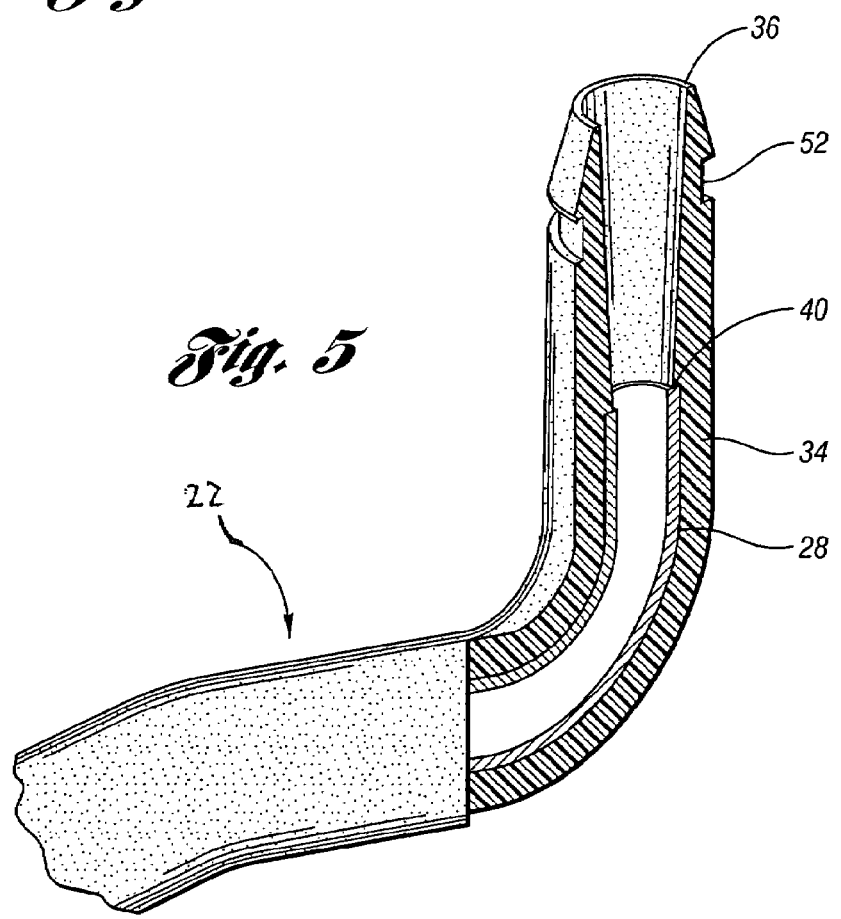
Fig. 5

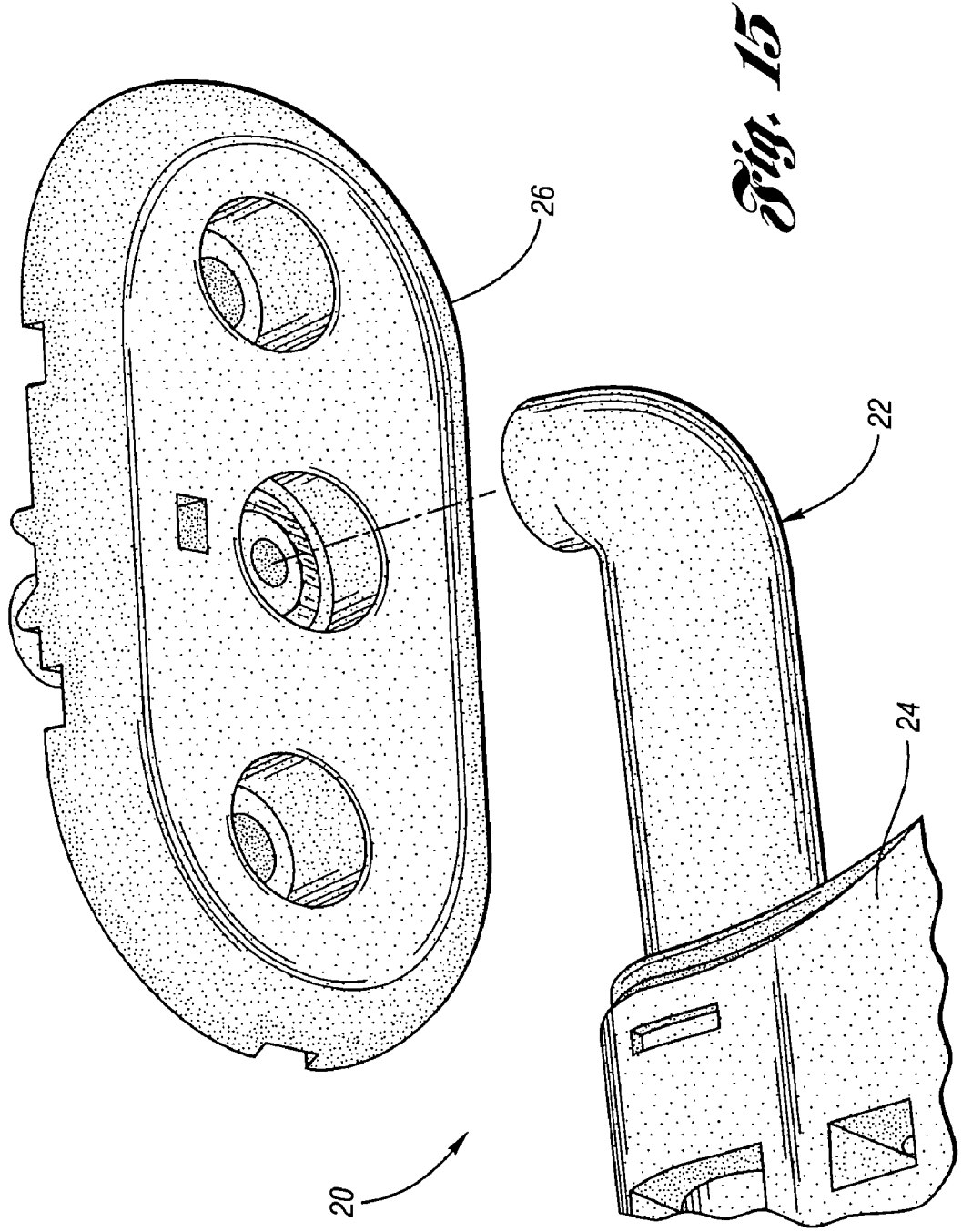

BREAKAWAY VISOR

BACKGROUND OF THE INVENTION

1. Field of the Invention

This subject invention generally relates to a sun visor for use in an interior of a vehicle, and more particularly, relates to a breakaway visor for use in an interior of an automotive vehicle that has a predetermined head impact energy absorbing arm therein.

2. Description of Related Art

Sun visors are well known and widely used, and a great many designs have been successfully employed in vehicles over the years. Manufacturers have developed a variety of ways by which visor bodies and other interior components may be constructed and mounted in a vehicle. The advantages in these designs, however often can add to complexity in the manufacturing process for interior components. There has been and continues to be a premium in the automotive industries on cost saving, and improvements in the efficiency and speed of manufacturing processes along with an increase awareness and focus on the interior of a vehicle being safer for occupants during crash situations.

Generally, motor vehicle standards are continuously being updated by the manufacturers and governmental entities. A particular area of current concern is occupant safety in the event of a crash with respect to head impact and interior components of an automotive vehicle. Generally, during crash situations, the occupants typically are violently moved in relation to the vehicle due to the inertial forces involved in a crash of a vehicle. Sometimes the most vulnerable portion of the occupant is the head. Vehicle manufacturers are now required to meet new safety standards to prevent head injury of the occupants of the vehicle when contact with interior portions of the vehicle may occur during crash situations.

One particular focus of governmental regulations within the interior of a passenger compartment of a motor vehicle is the impact of an occupant's head with a sun visor and/or sun visor rod during a crash situation. Sometimes an occupant, whose head violently strikes the sun visor or sun visor arm, may be injured because the energy of the impact will be delivered to a small surface area of the skull and/or the visor material may fracture exposing a rigid sharp edge of the occupant's head. Therefore, there is a need in the art for a breakaway sun visor that will provide absorption of energy during an impact of a sun visor with an occupant's body or head. Furthermore, there is a need in the art for a sun visor arm that will prevent injury to a vehicle occupant by breaking away thus removing the sun visor in a controlled manner from contact with the user of the vehicle. There also is a need in the art for an easy to manufacture and low cost breakaway visor that is capable for use in an interior of numerous types of motor vehicles. There also is a need in the art for a breakaway sun visor that will break at a predetermined point without having predetermined markings on an outside surface of the visor hence, providing a more aesthetically pleasing look for the visor to the occupants of the vehicle.

SUMMARY OF THE INVENTION

One object of the present invention may be to provide an improved sun visor for use in a vehicle.

Another object of the present invention may be to provide a breakaway sun visor for use in a vehicle to reduce head impact forces for a user of the vehicle.

Still another object of the present invention may be to provide a low cost and easier to manufacture breakaway visor for use in a vehicle.

Still another object of the present invention may be to provide a breakaway visor that has a tubular insert that is recessed a predetermined distance from a rotatable end of the visor arm.

Still another object of the present invention may be to provide a breakaway visor that has an arm that will allow an over molded arm to break at a predetermined position to allow the visor to dissipate energy via the visor arm breaking.

Yet another object of the present invention may be to provide a tubular insert shaft that is made of a metal that may be shortened, such that the plastic over mold arm only breaks at a predetermined break point which may be defined by a stabilizer pin hole, score line, or the end of the interior tubular shaft.

Still another object of the present invention may be to provide a first and second V-shaped notch on opposite sides of the breakaway arm wherein the breakaway arm has a predetermined load break strength at such notch points.

To achieve the foregoing objects, a breakaway visor arm for use in a vehicle interior is disclosed. The visor arm includes a molded tubular member having a first end and a second end wherein the first end is rotatably supported with respect to a roof of the interior of the vehicle. The visor arm also includes an elbow portion arranged a predetermined distance from the first end. The visor arm also includes a metal tubular insert arranged within the molded tubular member wherein the metal tubular insert having a first end within the molded tubular member and arranged a predetermined distance from the first end of the molded tubular member. The first end of the metal tubular member will define a break point for the visor arm when a head or other body part of a vehicle user comes in contact therewith, thus allowing for energy to dissipate with the visor arm breaking at the predetermined point.

One advantage of the present invention may be that it provides a novel and improved visor for use in the interior of a vehicle.

Still a further advantage of the present invention may be that it allows for a visor to have a breakaway arm that will help dissipate energy when the user of the vehicle comes in contact with the visor or visor arm.

Yet another advantage of the present invention may be that it provides a low cost and easier to manufacture breakaway visor arm for use in an automotive vehicle.

Yet a further advantage of the present invention may be that it provides a visor that is capable of meeting and exceeding the head impact standards required of automotive vehicles at the present time.

Still another advantage of the present invention is that it may provide a breakaway visor arm that includes a metal tubular insert molded over by a tubular member made of plastic wherein the tubular member is designed to break at a first end of the metal tubular insert that is arranged within the molded tubular member.

Still another advantage of the present invention may be the use of score lines, grooves or generally V-shaped notches to further define the break point of the visor arm, to move the visor and dissipate energy from the vehicle occupant during impact therewith during a crash situation.

Other objects, features and advantages of the present invention will become apparent from the subsequent description and the appended claims, taken in conjunction with the accompanying drawings.

BRIEF DESCRIPTION OF THE DRAWINGS

FIG. 3 shows a partial cross section of the breakaway visor arm of FIG. 1.

FIG. 4 shows a cross section of the breakaway visor arm according to FIG. 1.

FIG. 5 shows an alternate embodiment of a breakaway visor arm according to the present invention.

FIG. 15 shows the breakaway visor arm after being broken due to impact from a vehicle user according to the present invention.

DESCRIPTION OF THE EMBODIMENT(S)

Figure 1:
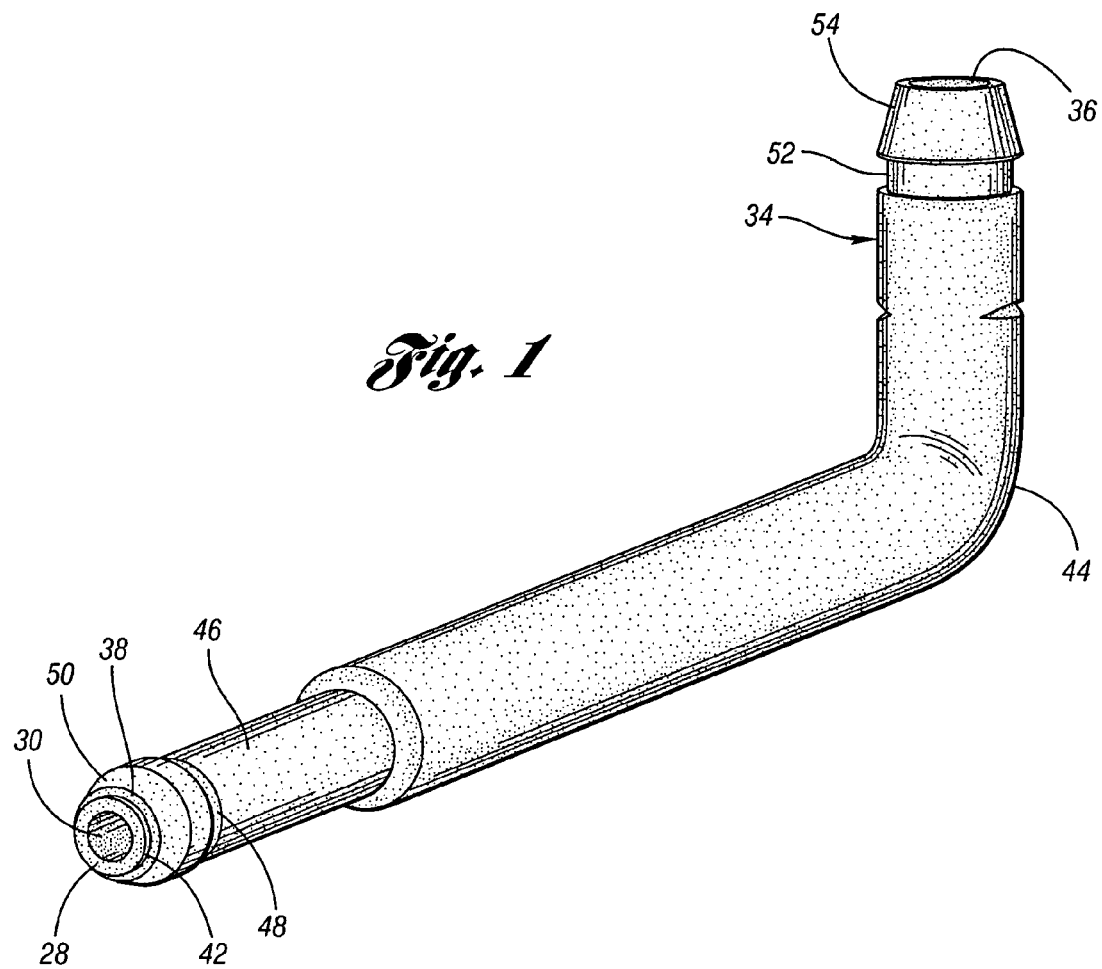
FIG. 1 shows a breakaway visor arm according to the present invention.
Figure 2:
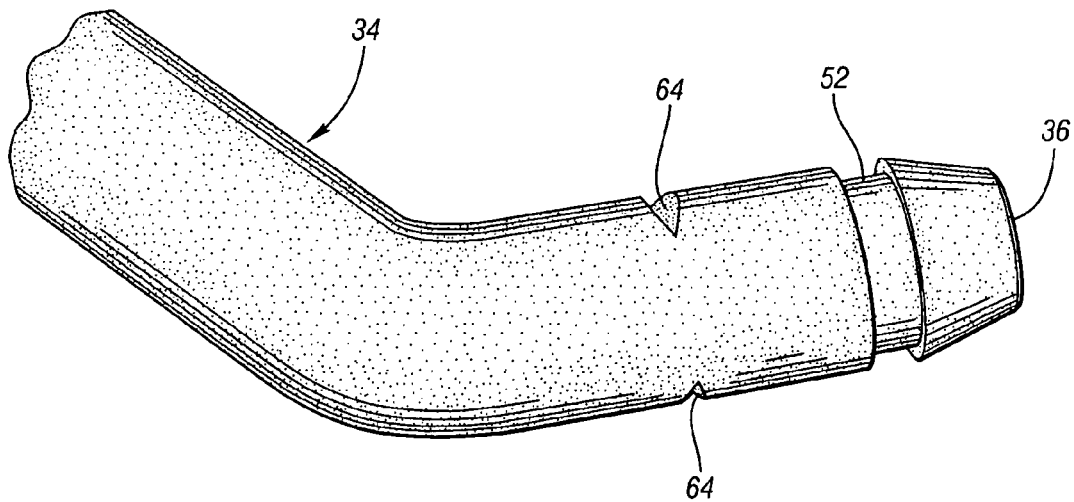
FIG. 2 shows an end view of the breakaway visor arm according to FIG. 1.
Figure 6:
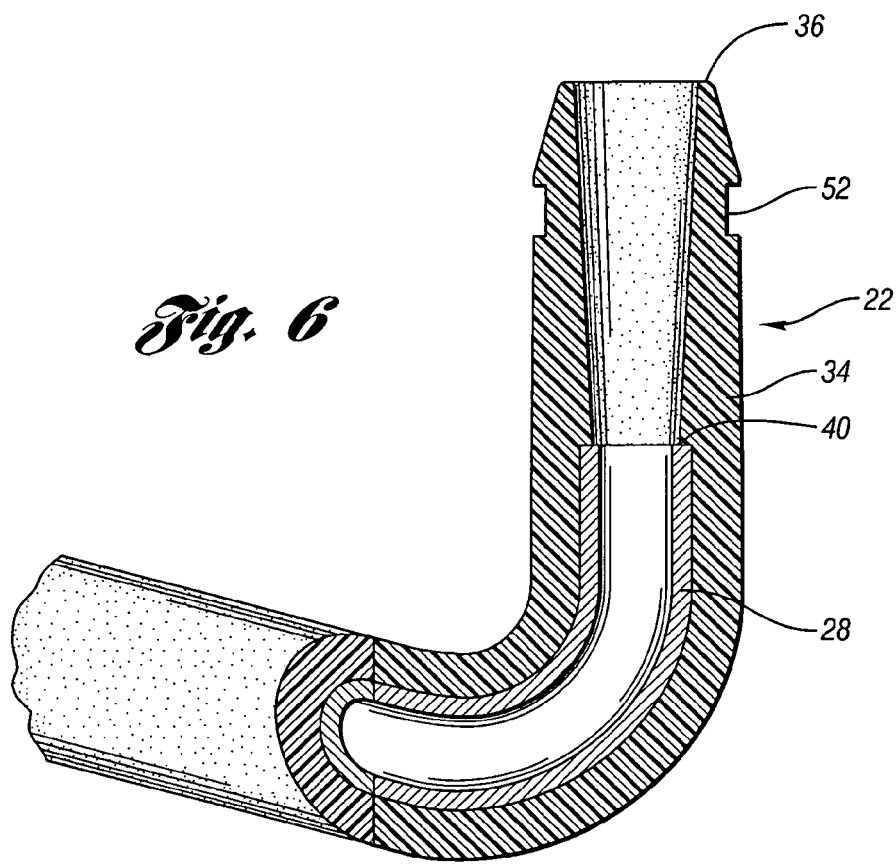
FIG. 6 shows a partial cut away of the breakaway visor arm according to FIG. 5.
Figure 7:
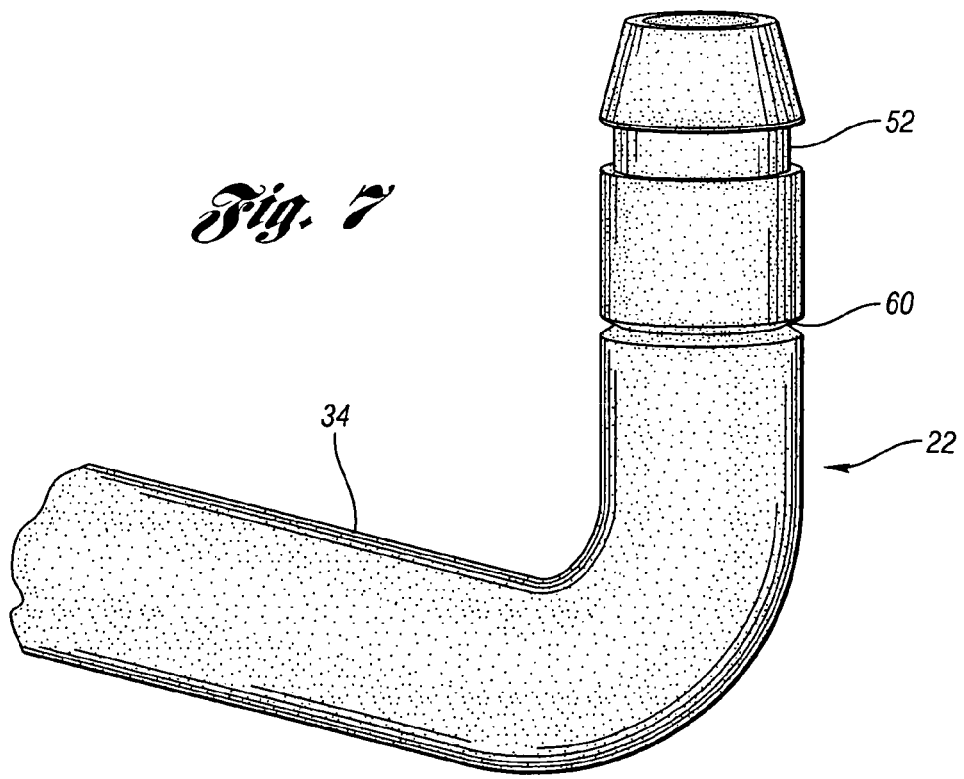
FIG. 7 shows a plan view of an alternate embodiment of a breakaway visor arm according to the present invention.
Figure 8:
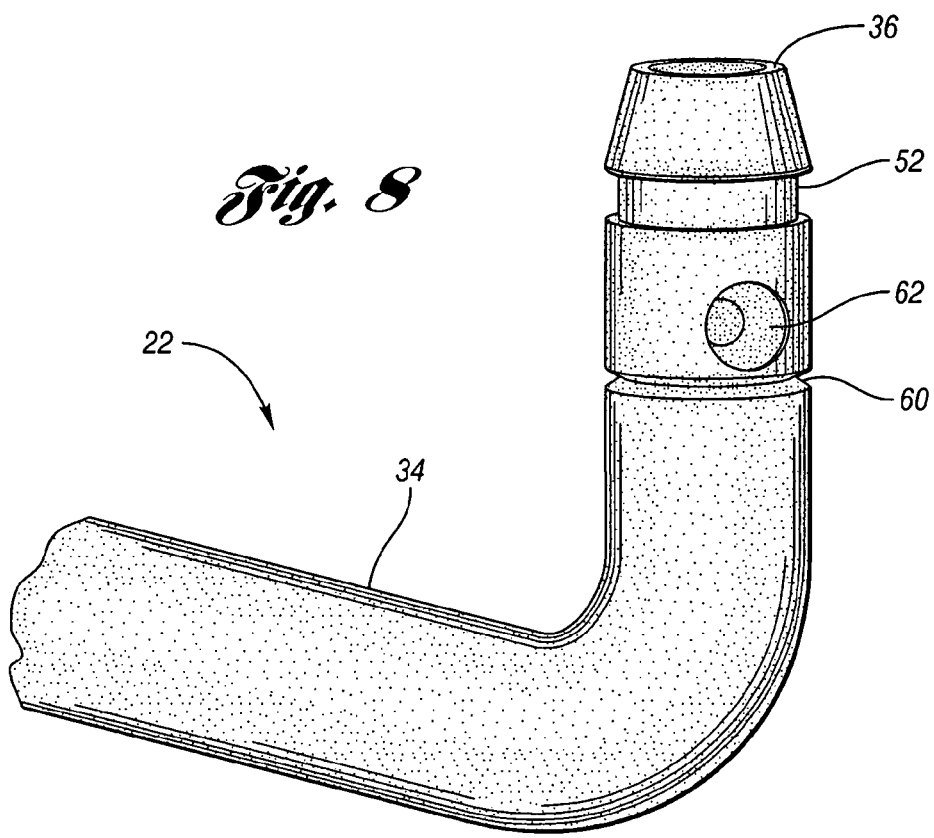
FIG. 8 shows another alternate embodiment of a breakaway visor arm according to the present invention.
Figure 9:
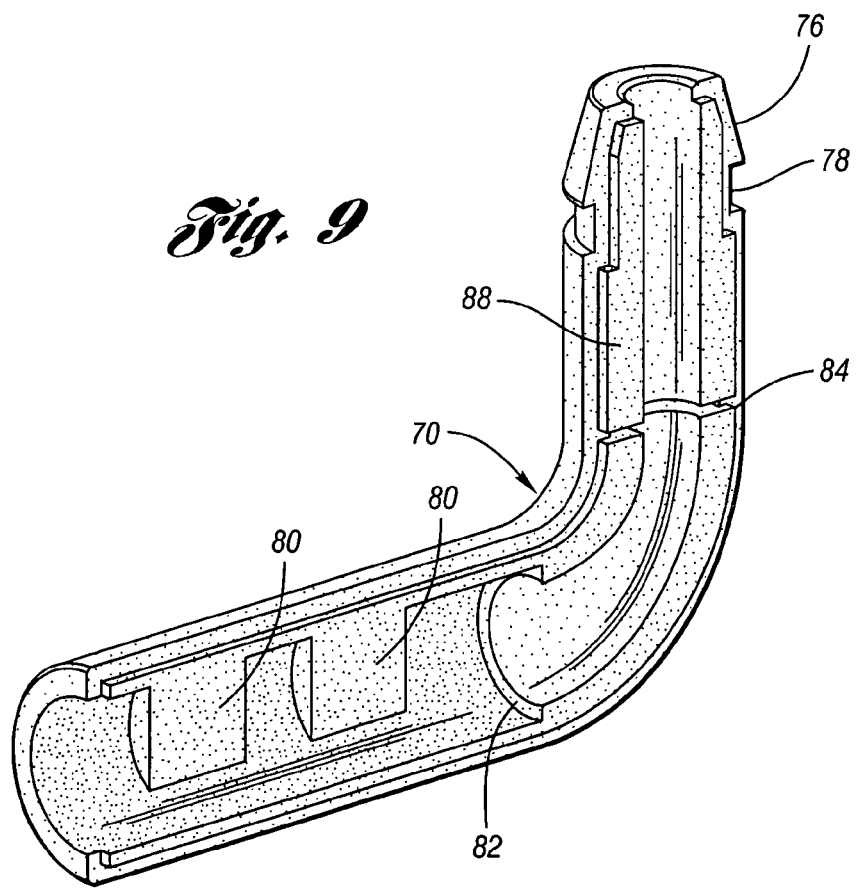
FIG. 9 shows a cross sectional view of an alternate embodiment of a breakaway visor arm according to the present invention.
Figure 10:
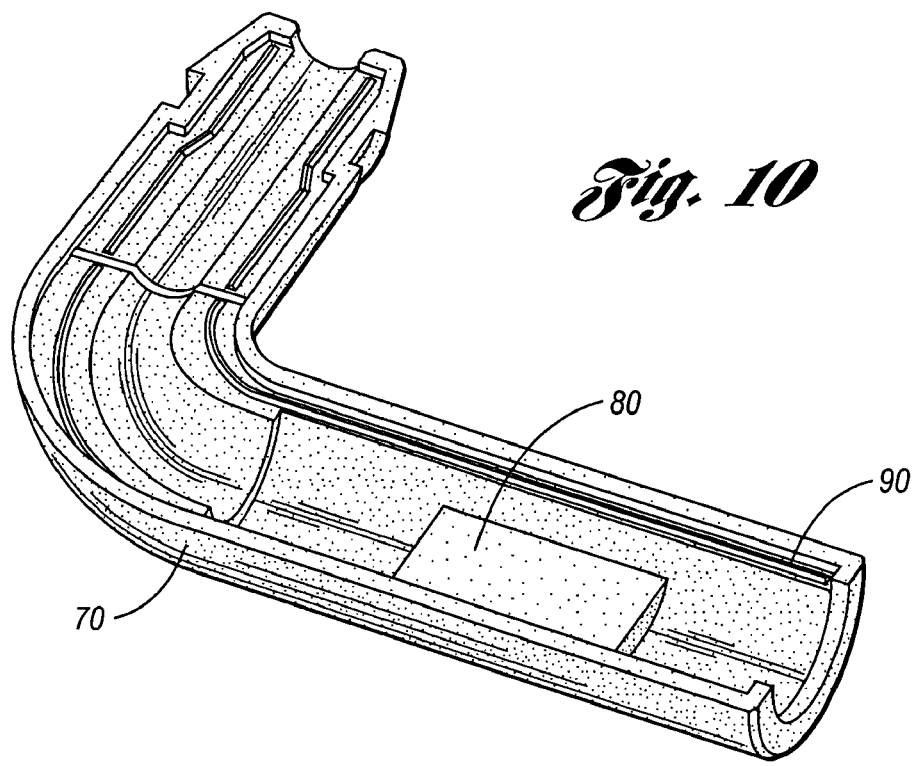
FIG. 10 shows a cross section of a breakaway visor arm according to FIG. 9.
Figure 11:
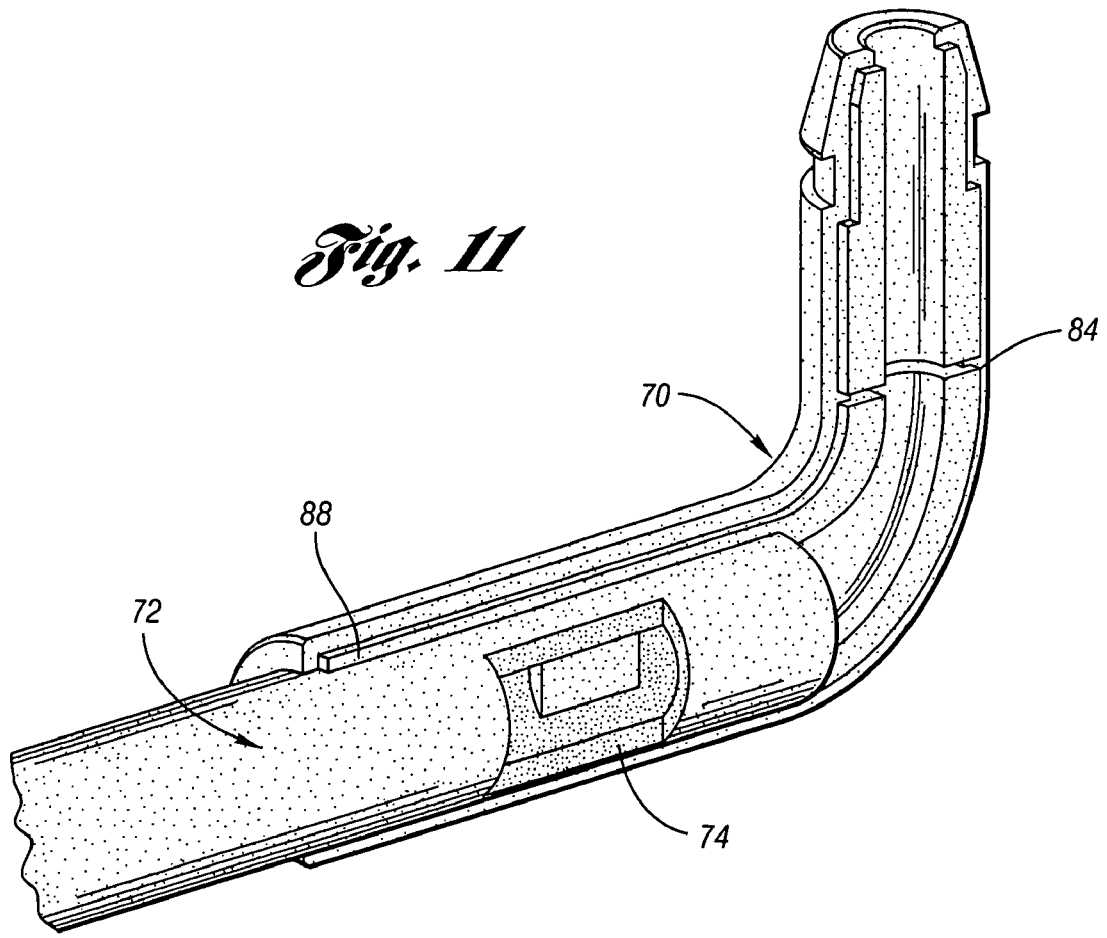
FIG. 11 shows a shaft inserted in an elbow member of the breakaway visor arm of FIG. 9.
Figure 12:
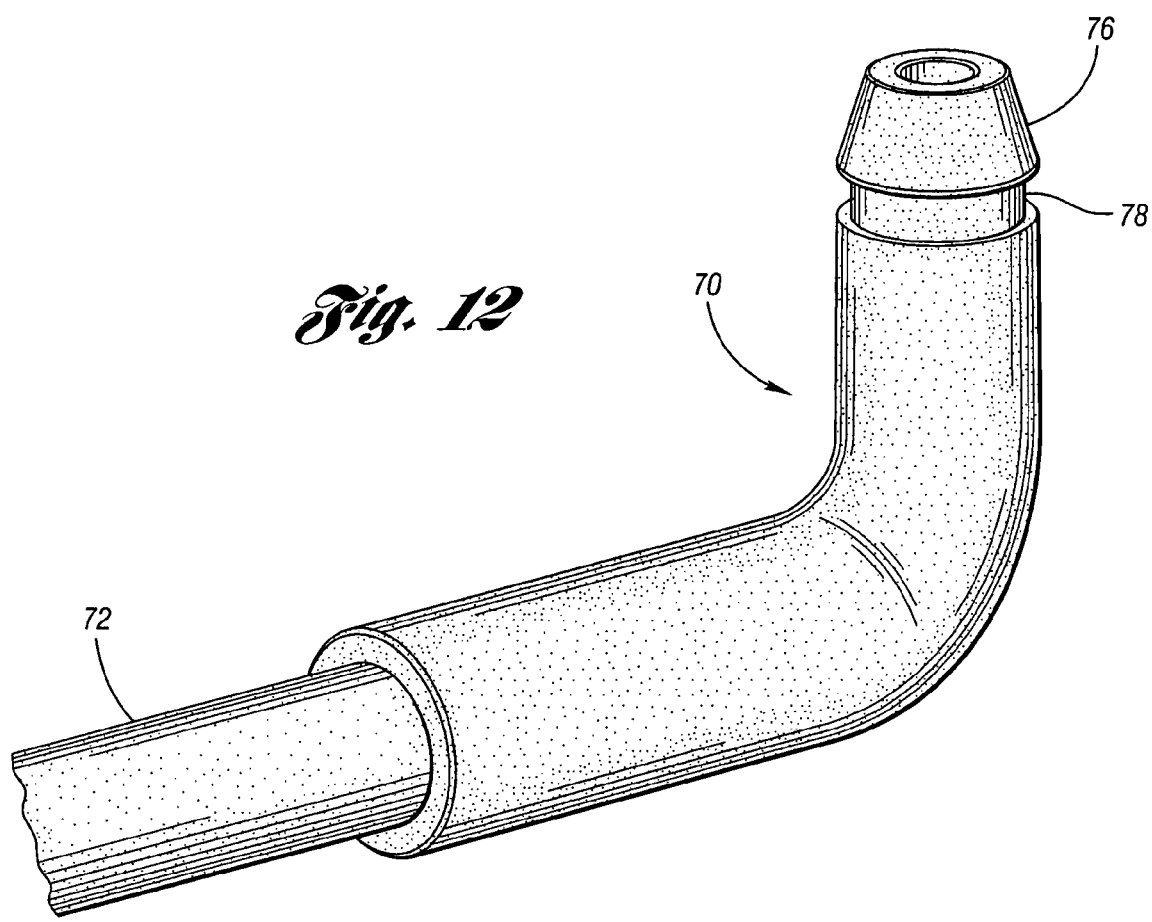
FIG. 12 shows a plan view of the breakaway visor arm of FIG. 9.

Referring to the drawings, a breakaway sun visor 20 for use in the interior of a vehicle compartment is shown. It should be noted that the breakaway visor 20 of the present invention can be used in any known vehicle, such as air, water, automobile, space, or any other type of vehicle that has the need for a visor to block exterior sun from infiltrating the interior cabin of the vehicle thus distracting the driver or passengers in such vehicles. The visor 20 generally is arranged in a vehicle, such as an automotive vehicle, and connected to an interior compartment roof or headliner of a vehicle in a rotatable manner. The visor 20 is capable of being folded down into a use position and then stored up against the roof of the interior of the vehicle in a stored position. The visor 20 is also rotatable between a front window and a side window of the vehicle. The visor 20 also may be capable of sliding with relation to the breakaway arm 22 of the present invention and stop at certain positions and be held in certain positions using technology previously developed by the Applicant.

Figure 13:
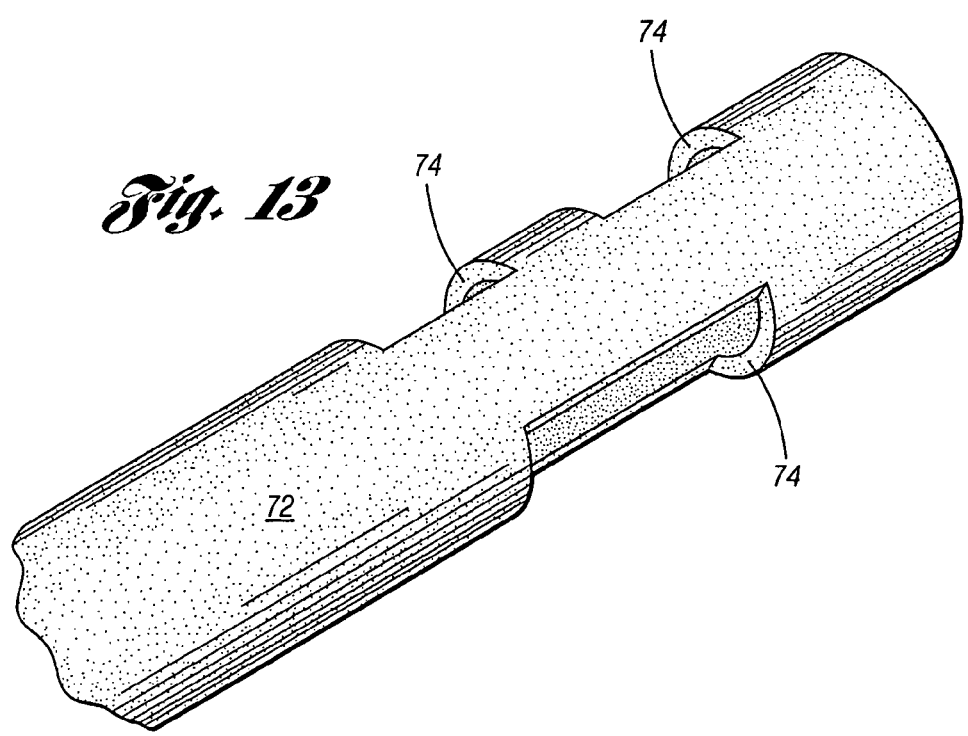
FIG. 13 shows a shaft for use with a breakaway visor arm according to FIG. 9.
Figure 14:
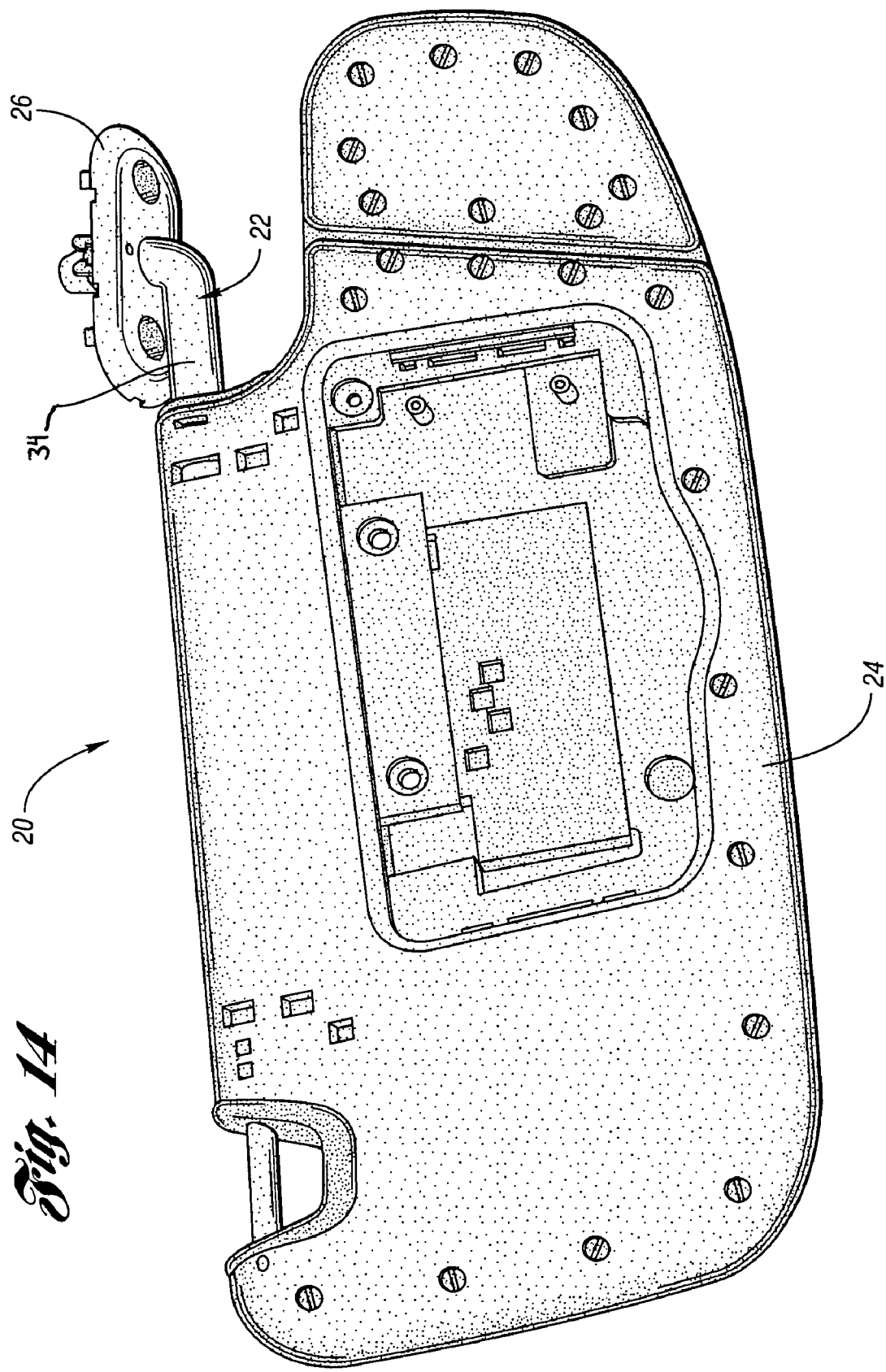
FIG. 14 shows a breakaway visor according to the present invention.

FIGS. 1 through 15 generally show multiple embodiments of a breakaway visor 20 according to the present invention. FIGS. 14 and 15 generally show the breakaway visor 20 as it is used in an automotive vehicle. The visor 20 shown in FIG. 14 includes a visor body 24 that may be formed of two half shells or molded as one piece, depending on the design requirements. It should be noted that any known material can be used to make the visor body 24 and not just that disclosed in FIG. 13. The visor body 24 may have any known shape and may include accessories such as, but not limited to, mirrors, lights, ticket clips, adjustable flaps, map straps, or D-rings located at an end thereof all to allow for multiple uses and positions of the breakaway visor 20 within the automotive vehicle. Arranged within the visor body 24 may be a breakaway visor arm 22 according to the present invention. The breakaway visor arm 22 may be capable of sliding with respect to the visor body 24 in some contemplated embodiments and it is also capable of rotating with respect to the visor body 24 in some contemplated embodiments. A mounting bracket 26 which is secured to the interior roof or headliner of the automotive vehicle will rotatably support one end of the breakaway arm 22 for the breakaway visor 20 according to the present invention. Any known methodology of connecting the mounting bracket 26 to the vehicle interior roof may be used with the present invention. It should be noted that the visor 20 in FIG. 14 does not have a finished cover over the top thereof and may include an upholstery cover there over to create a more aesthetically pleasing visor for the user of the vehicle.

The breakaway visor arm 22 of the present invention generally has an overall L-shape when viewed from a side. The breakaway visor arm 22 includes a metal tubular insert or member 28 that generally has a hollow bore 30 running along an entire length thereof. It also includes an elbow portion 32 that creates a generally 90° bend or transition near one end of the metal tubular insert 28. In one contemplated embodiment the metal tubular insert 28 may have a predetermined sized long portion and a predetermined sized short portion which form the general L-shape when viewed from a side thereof. It should be noted that it is contemplated to use any type of metal material for the tubular insert member 28, however in one preferred embodiment steel, aluminum or any other such alloy may be used to create the metal tubular insert shaft 28. It should be noted that any other type of metal may also be used for the tubular insert 28. In one contemplated embodiment the long portion of the tubular metal insert 28 is approximately 212 millimeters long while the short portion of the tubular metal insert 28 is approximately 16 millimeters long. However it should be noted that any other dimensions may be used for the metal tubular insert 28 for the breakaway visor arm 22 of the present invention. It should also be noted that in one contemplated embodiment the 90° angle may be used as the transition between the short portion and long portion of the tubular metal insert 28, however any other complex angle may be used for the transition in the tubular metal insert 22 of the present invention. It is also contemplated to use a solid metal tubular insert that does not have the bore 30 running along the entire length thereof. It should be noted that the visor arm tubular insert 28 may have any known dimensions including any known diameter or width or any known shape depending on the design requirements of the breakaway visor of the present invention.

The breakaway visor arm 22 also includes a molded tubular member 34 which is molded over the metal tubular insert 28. The molded tubular member 34 generally encapsulates the metal tubular insert 28 with a predetermined tubular shape. However, it should be noted that any other shape may also be used for the molded tubular member 34. In one contemplated embodiment any type of moldable plastic may be used wherein in one particular embodiment the plastic may be a nylon gas filled material or general nylon depending on the vehicle environment predetermined load break strength and necessary head impact requirements required by the manufacturer. It should also be noted that the molded tubular member 34 may also include softer materials than plastic, such as rubber over coatings, or the like to further reduce head impact forces therewith. The molded tubular member 34 generally will have a first end 36 and a second end 38 whereas the metal tubular insert 28 will also have a first end 40 and a second end 42 with the first end 40 arranged on the short portion of the metal tubular insert 28 and the second end 42 arranged on the longer portion of the metal tubular insert 28. The molded tubular member 34 also will have a short portion and a long portion. The short portion and long portion also will create a general L-shape when viewed from a side. The short portion may be used to interconnect with and rotatably move with respect to the mounting bracket 26 of the visor 20. The short portion may have a predetermined length while the long portion may also have a predetermined length therein. In one contemplated embodiment the long portion of the molded tubular member 34 has an approximate 211 millimeter length while the short portion of the molded tubular member 34 has an approximate thirty four millimeter length. However, it should be noted that any other size molded tubular member 34 may also be used depending on the design requirements and impact requirements needed for the interior of the automotive vehicle. It should be noted that the molded tubular member 34 may also include an elbow portion 44 that generally will create a 90° angle transition between the short portion of the molded tubular member 34 and the long portion of the molded tubular member 34. However, it should further be noted that the approximate 90° angle of the elbow portion 44 may also have any other known angle arranged therebetween, as long as that angle matches the angle of the metal tubular insert 28.

The molded tubular member 34 may have on its long portion thereof a predetermined diameter and a predetermined thickness of molded plastic along the metal tubular insert 28 such that the molded plastic directly engages and encapsulates the metal tubular insert 28. Arranged near the second end 38 of the molded tubular member 34 may be a reduced diameter portion 46 that may have a predetermined length transitional angled section which may gradually reduce down to the reduced diameter portion arranged at the second end 38 of the molded tubular member 34. The molded tubular member 34 also may have arranged near the second end thereof a circumferential groove 48 therein. Adjacent to the circumferential groove 48 may be a further reduced angled diameter portion 50 such that the second end 38 may be able to interact with interior locking mechanisms within the visor body 24 to ensure the visor body 24 does not dislodge from the breakaway visor arm 22. The reduced diameter portion 46 of the molded tubular member 34 may also include a plurality of indentation or flat portions to allow for proper storage of the breakaway visor 20 against the vehicle roof and proper deployment of the visor 20 into its sun blocking position via detent mechanisms or the like. The circumferential groove 48 is arranged a predetermined distance from the second end 38 and may be used to interact with and secure the breakaway visor arm 22 to the visor body 24.

The metal tubular insert second end 42 may extend in one contemplated embodiment a predetermined distance from the second end 38 of the molded tubular member 34. In one contemplated embodiment this extension will be approximately two millimeters from the second end 38 of the molded tubular member 34 to the second end 42 of the metal tubular insert 28. However, it should be noted that any other defined distance may also be used or in another contemplated embodiment the second end 42 of the metal tubular insert 28 may be aligned with the second end 38 of the molded tubular member 34 or arranged therein in a recessed manner.

On the short portion of the molded tubular member 34 a circumferential groove 52 may be arranged a predetermined distance from the first end 36 of the molded tubular member 34. The first end 36 of the molded tubular member 34 may include an angled end 54 thereof that will allow for insertion and securing of the first end 36 of the molded tubular member 34 into the mounting bracket 26 of the breakaway visor 20. This may allow for the first end of the breakaway arm 22 to be secured within the mounting bracket 26 and also be rotatable with respect to the mounting bracket 26 to allow for the visor 20 to be moved between a front windshield position and a side window position. Generally, the angled end 54 of the first portion of the molded tubular member 34 may allow for insertion of the circumferential groove 52 arranged near that first end 36 to interact with a locking surface in the mounting bracket 26 such that the predetermined angled surfaces 54 will allow for a complete securement between the mounting bracket 26 and the breakaway visor arm 22. It should be noted that any other contemplated and known securing mechanism between a rotatable visor arm 22 and a mounting bracket 26 on the interior roof of a vehicle may also be used according to the present invention. The first end 36 of the molded tubular member 34 may extend a predetermined distance over and beyond the first end 40 of the metal tubular insert 28. This recessing of the metal tubular insert 28 a predetermined distance from the first end 36 of the molded tubular member 34 defines a breaking point for the breakaway visor arm 22 according to the present invention. The breakaway point occurs on the molded tubular member 34 at the end 40 of the metal tubular insert 28. Therefore, this breakaway point can be moved depending on the length of the short portion of the metal tubular insert 28. This breakaway point allows for the breakaway arm 22 to dislodge the short portion from the long portion thus moving the visor body 24 out of the way of the vehicle user whose head has impacted either the visor body 24 or visor arm 22. Such dislodging is shown in FIG. 15 of the present invention. It should be noted that the molded tubular member 34 may have a smooth aesthetically pleasing outer surface thereon thus concealing the fact that the visor arm 22 is a breakaway visor arm 22 by having no marks on the outer surface thereof. The breaking point is defined on the molded tubular member 34 by the interior metal tubular insert 28 being recessed a predetermined distance from the first end 36 of the molded tubular member 38. The break point occurs where the first end 40 of the metal tubular insert 28 interacts with the molded tubular member 34 molded there over. This will allow for any impact by the head of a user of a vehicle or occupant therein during a crash situation to dislodge and dissipate the energy via the visor arm 22 breaking and thus removing the visor body 24 from further contact with the vehicle user's head.

In other contemplated embodiments shown in other figures a ring like scored line 60 may also be arranged on either an interior surface or the exterior surface of the short portion of the molded tubular member 34. This scoring 60 can be in the form of a scratch or groove arranged on the interior or exterior surfaces of the short portion of the molded tubular member 34. The scoring 60 can occur around the entire circumference of the molded tubular member 34 or only at predetermined portions of the short portion of the molded tubular member 34. The groove 60 generally may have a V-shape as will the score line 60 put therein. It should be noted that any other shaped groove or score line may also be used. Therefore, the molded tubular member 34 may include score ring lines there around or have an unscored and smooth looking appearance depending on the design requirements of the vehicle. It should also be noted that in another contemplated embodiment a stabilizer pin hole or cavity 62 may be used in conjunction with or without a score line 60 to further emphasize the break point of the breakaway visor arm 22 according to the present invention. The use of the stabilizer pin hole 62 may also allow for adjusting at what force the breakaway visor arm 22 will in fact fail, thus moving the visor 20 from engagement with the occupant's head at a predetermined time during a crash situation in the vehicle. It should be noted that the design parameters may allow for the visor 20 to break during crashes that are deemed necessary by the manufacturer but will not allow breaking of the breakaway visor arm 22 due to accidental bumping or engagement with the visor 20 by an occupant's head, shoulder, arm or other body part. Therefore, the ability to use score lines 60 of varying depths and shapes along with stabilizer pin holes 62 or the like around the outer circumference or inner circumference of the short portion of the molded tubular member 34 may allow for fine tuning of the break point and timing of the break of the breakaway visor depending on the forces engaged therewith.

Another contemplated embodiment includes at least one notch 64 arranged on an outer surface of the short portion of the molded tubular member 34. In another embodiment a first and second notch 64 will be arranged on the short portion of the molded tubular member 34 with the first notch 54 arranged 180° from the second notch 64. It should be noted that the notches 64 may have any known size or shape or be arranged in any manner and pattern on the shorter portion of the molded tubular member 34. Generally, the score lines, grooves or notches are arranged directly adjacent to or in the same plane as the first end 40 of the metal tubular insert 28 on the outer or inner surface of the molded tubular member 34. However, they may also be arranged anywhere on the short portion of the molded tubular member 34.

FIGS. 9 through 13 show yet another embodiment of the breakaway visor arm 22 that includes an elbow member 70 having a shaft 72 inserted in one end thereof. The opposite end of the elbow member 70 may be used to interact with and secure to the mounting bracket 26 according to the present invention. The shaft 72 of this embodiment generally will be tubular in shape and may be made of any metal, ceramic, composite, plastic, or any other known material. In one preferred embodiment the shaft 72 may be made of a metal material and the shaft 72 may include at least one orifice 74 and in the embodiment shown three orifices 74 with two orifices 74 on one side thereof and an orifice 74 on the opposite side thereof to interact with and secure the shaft 72 to the elbow member 70 of this embodiment of the breakaway arm 22. The elbow member 70 generally may have a 90° angle therein and generally will be made of a molded plastic material. However, any other type of plastic, ceramic, natural material, or metal material may also be used. It should further be noted that for all of the embodiments described herein the breakaway visor arm 22 can be made of any known plastic, ceramic, composite, natural material, or metal material and may be made of methodologies other than molding as described herein. The elbow member 70 may include an angled portion 76 at one end thereof that may be used to interact with the mounting bracket 26 of the present invention. Adjacent to that angled surface 76 on one end thereof may be a circumferential groove 78 around an entire circumference thereof which may be used to lock and engage the breakaway arm 22 in a rotatable manner with the mounting bracket 26. The elbow member 70 may include a plurality of locking members 80 extending from an interior surface thereof. In one contemplated embodiment two locking members 80 are arranged on one side wall thereof while a third locking member 80 is arranged on an opposite side wall thereof. These locking members 80 may interact with and engage with the locking orifices 74 arranged on one end of the shaft 72 according to the embodiment in FIG. 9. The interior of the elbow member 70 according to this embodiment may also include a shoulder 82 arranged at a predetermined position therein which may ensure that the shaft 72 stops at a predetermined position within the elbow member 70 hence, aligning the shaft 72 in proper position with the locking surfaces and members 80 arranged on the interior of the elbow member 70. The elbow member 70 may also include arranged on an interior circumference thereof a ring like groove 84 that will define a break point for the breakaway arm 22 according to this embodiment. The ring like groove 84 may be arranged any where on the vertical or short portion of the elbow member 70 according to the present invention. This circumferential ring like groove 84 may be arranged a predetermined distance from a first end of the elbow member 70. This groove 84 can be of any shape and can be the entire circumference thereof or only a portion of the circumference thereof on the interior bore surface of the elbow member 70. It should also be noted that this interior ring like groove 84 may also be used in conjunction with scoring on the outer surfaces or stabilizer pin holes on the outer surfaces depending on the requirements and engineering requirements of the breakaway arm 22. In the embodiment shown the elbow member 70 may be made of a first and second member that are joined via one another. One of the members may include a ridge 88 along the entire side length thereof. While the other portion of the elbow member 70 may include a channel 90 that will allow the ridge 88 to be inserted into the channel 90 and the two halves secured to one another via any known fastening technique for plastic, metal or the like. It should further be noted that it is also contemplated to mold the elbow member 70 as one piece with the shaft 72 either molded over or inserted after molding of the elbow member 70 as one piece. The embodiment shows the two piece elbow member 70 of one contemplated embodiment. Therefore, in the embodiment shown each half of the elbow member 70 will have a half of a ring like groove 84 arranged at a predetermined position within the elbow member 70 to provide the break point for the breakaway arm 22 as described above.

Therefore, in use any of the embodiments described above allow for a breakaway visor arm 22 to be used with any other known visor body 24 and absorb any normal bumping by a occupant's head, arm, bag or other component within the vehicle, but during crash situations where the head impact forces could cause injury to the occupant of the vehicle, the breakaway visor arm 22 will break away at a predetermined break point located on the short portion of the breakaway visor arm 22 and absorb and dissipate energy via the visor arm 22 breaking thus reducing the impact forces on the head of the occupant's of the motor vehicle in which the breakaway visor 20 is used. This will greatly reduce the chance of injury and fulfill the head impact requirements required by governmental agencies throughout the world.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A visor arm for use with a visor in a vehicle, said visor arm including:
   a molded tubular member having a first end and a second end, said first end rotatably supported with respect to a roof of a vehicle;
   an elbow portion arranged a predetermined distance from said first end; and
   a metal tubular insert member arranged within said molded tubular member, said metal tubular insert member having a first end within said molded tubular member and arranged a predetermined distance from said first end of said molded tubular member, said first end of said metal tubular insert member defines a breaking point of the visor arm to dissipate energy when a vehicle user comes in contact with the visor during a crash situation.

2. The visor arm of claim 1 wherein said molded tubular member having a scored line or groove around a circumference thereof and on an outer surface or inner surface thereof.

3. The visor arm of claim 2 wherein said scored ring like line is in a plane with said first end of said metal tubular insert member.

4. The visor arm of claim 1 wherein said molded tubular member having a first notch and a second notch arranged 180° from another on a short portion of said molded tubular member.

5. The visor arm of claim 1 wherein said molded tubular member is made of a plastic material.

6. The visor arm of claim 1 wherein said metal tubular insert member having a second end, said second end extends a predetermined distance from said second end of said molded tubular member.

7. A breakaway visor for use in reducing head impact injuries in a vehicle during crash situations, said visor including:
- a body disposed in a cabin of the vehicle for blocking outside light;
- a breakaway arm having a first end and a second end, said second end arranged in said body, said arm having an elbow arranged near said first end thereof, said arm having a metal tubular insert with a first end and a second end, said arm having a molded tubular member molded over said metal tubular insert, said first end of said metal tubular insert being recessed within said molded tubular member a predetermined distance from a first end of said molded tubular member; and
- a mounting bracket secured to a roof of the vehicle, said first end of said breakaway arm is rotatably secured in said mounting bracket.

8. The visor of claim 7 wherein said molded tubular member having a scored line or groove around a circumference thereof and on an outer surface or inner surface thereof.

9. The visor of claim 8 wherein said scored line or groove is arranged adjacent to said first end of said metal tubular insert.

10. The visor of claim 7 wherein said molded tubular member having a first notch and a second notch arranged 180° from another on a short portion of said molded tubular member.

11. The visor of claim 7 wherein said molded tubular member is made of a plastic material.

12. The visor of claim 7 wherein said metal tubular insert second end extends a predetermined distance from a second end of said molded tubular member.

13. The visor of claim 7 wherein said elbow having a complex or 90° angle.

14. The visor of claim 7 wherein said arm having a circumferential groove near both ends thereof for securing said arm to said mounting bracket and said body, respectively.

15. A breakaway visor arm for use with a visor in a vehicle, said visor arm including:
- an elbow member rotatably supported to an interior roof of the vehicle, said elbow member having a tube shape, said elbow member having a circumferential groove arranged on an inside surface of said elbow member, said elbow member having at least one locking tab extending from an inside surface thereof;
- a shaft arranged in an end of said elbow member, said shaft having at least one orifice through an outside surface thereof, said locking tab extends into said orifice to secure said shaft to said elbow member; and
- said circumferential groove defines a breaking point for the breakaway visor arm when a vehicle occupant strikes the visor during a crash situation.

16. The visor arm of claim 15 further including a circumferential groove on an outside surface of said elbow member.

* * * * *

UNITED STATES PATENT AND TRADEMARK OFFICE
CERTIFICATE OF CORRECTION

PATENT NO. : 7,703,832 B2  Page 1 of 1
APPLICATION NO. : 12/214145
DATED : April 27, 2010
INVENTOR(S) : William Robert Shorter et al.

It is certified that error appears in the above-identified patent and that said Letters Patent is hereby corrected as shown below:

Col. 9, Claim 3 - Please delete Claim 3 as written and insert new claim 3 as approved in amendment dated 12/3/2009

--3. The visor arm of claim 2 wherein said scored line or groove is in a plane with said first end of said metal tubular insert member.--

Col. 9, Claim 7 - Please delete Claim 7 as written and insert new claim 7 as approved in amendment dated 12/3/2009

--7. A breakaway visor for use in reducing head impact injuries in a vehicle during crash situations, said visor including:

a body disposed in a cabin of the vehicle for blocking outside light;

a breakaway arm having a first end and a second end, said second end arranged in said body, said arm having an elbow arranged near said first end thereof, said arm having a metal tubular insert with a first end and a second end, said arm having a molded tubular member molded over said metal tubular insert, said first end of said metal tubular insert being recessed within said molded tubular member a predetermined distance from a first end of said molded tubular member, said first end of said metal tubular insert defines a breaking point of said arm to dissipate energy when a vehicle occupant comes in contact with the visor during a crash situation; and a mounting bracket secured to a roof of the vehicle, said first end of said breakaway arm is rotatably secured in said mounting bracket.--

Signed and Sealed this

Sixth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,703,832 B2 Page 1 of 1
APPLICATION NO. : 12/214145
DATED : April 27, 2010
INVENTOR(S) : William Robert Shorter et al.

It is certified that error appears in the above-identified patent and that said Letters Patent is hereby corrected as shown below:

Col. 9, lines 10-12, Claim 3 - Please delete Claim 3 as written and insert new claim 3 as approved in amendment dated 12/3/2009

--3. The visor arm of claim 2 wherein said scored line or groove is in a plane with said first end of said metal tubular insert member.--

Col. 9, lines 23-39, Claim 7 - Please delete Claim 7 as written and insert new claim 7 as approved in amendment dated 12/3/2009

--7. A breakaway visor for use in reducing head impact injuries in a vehicle during crash situations, said visor including:

a body disposed in a cabin of the vehicle for blocking outside light;

a breakaway arm having a first end and a second end, said second end arranged in said body, said arm having an elbow arranged near said first end thereof, said arm having a metal tubular insert with a first end and a second end, said arm having a molded tubular member molded over said metal tubular insert, said first end of said metal tubular insert being recessed within said molded tubular member a predetermined distance from a first end of said molded tubular member, said first end of said metal tubular insert defines a breaking point of said arm to dissipate energy when a vehicle occupant comes in contact with the visor during a crash situation; and a mounting bracket secured to a roof of the vehicle, said first end of said breakaway arm is rotatably secured in said mounting bracket.--

This certificate supersedes the Certificate of Correction issued July 6, 2010.

Signed and Sealed this

Third Day of August, 2010

David J. Kappos
*Director of the United States Patent and Trademark Office*